United States Patent
Pollock et al.

(10) Patent No.: US 7,225,933 B1
(45) Date of Patent: Jun. 5, 2007

(54) MOUNTED STORAGE DEVICE

(75) Inventors: Daniel A. Pollock, Perrysburg, OH (US); Alexander O. Bally, Barrington, RI (US); Stephen L. Cechner, Sylvania, OH (US)

(73) Assignee: Gear Up Technologies Corporation, Perrysburg, OH (US)

( * ) Notice: Subject to any disclaimer, the term of this patent is extended or adjusted under 35 U.S.C. 154(b) by 128 days.

(21) Appl. No.: 10/847,552

(22) Filed: May 17, 2004

Related U.S. Application Data

(60) Provisional application No. 60/523,956, filed on Nov. 21, 2003.

(51) Int. Cl.
  *A47F 7/00* (2006.01)
(52) U.S. Cl. .......................... 211/18; 211/18; 211/118; 211/21; 211/171; 248/292.11
(58) Field of Classification Search ................. 14/71.7; 123/406.11, 195 A, 406.67; 70/234; 267/120, 267/64.12, 64.26; 211/17, 118, 18, 104, 211/116, 100, 162, 19, 113, 117, 21, 5, 101, 211/171; 248/294.1, 339, 292.11, 564; 224/509; 239/166; 410/3; 296/56; 312/327, 325
See application file for complete search history.

(56) References Cited

U.S. PATENT DOCUMENTS

| | | | |
|---|---|---|---|
| 557,567 | A | 4/1896 | Eddy |
| 580,032 | A | 4/1897 | Bierbach |
| 610,656 | A | 9/1898 | Martin |
| 618,394 | A | 1/1899 | Clark |
| 618,999 | A | 2/1899 | Sayer |
| 621,819 | A | 3/1899 | Ivatt |
| 624,231 | A | 5/1899 | Martin |
| 633,806 | A | 9/1899 | Cifka |
| 1,232,501 | A | 7/1917 | Colen |
| 2,875,903 | A | 3/1959 | Shourds |
| 3,417,874 | A | 12/1968 | Bryant |
| 3,782,559 | A | 1/1974 | Wright |
| 3,827,413 | A | 8/1974 | Meacham |
| 3,872,972 | A | 3/1975 | Cummins et al. |

(Continued)

FOREIGN PATENT DOCUMENTS

DE  4209007  8/1993

(Continued)

*Primary Examiner*—Richard E. Chilcot, Jr.
*Assistant Examiner*—Lindsay M. Maguire
(74) *Attorney, Agent, or Firm*—MacMillan, Sobanski & Todd, LLC

(57) ABSTRACT

A mounted storage device includes a mount for mounting the device on a vertical surface. A load arm is supported on the mount and structured to support an object thereon. The load arm is movable between a load position for loading the object on the load arm and a store position for storing the supported object. The storage device also includes a force device connected between the mount and the load arm that urges the load arm in a direction from the load position to the store position. The storage device further includes a resistance damper connected between the mount and the load arm that resists movement of the load arm in both directions between the load position and the store position. The resistance damper includes a plurality of damper members that creates the resistance by at least one of friction and compression tension between the damper members.

23 Claims, 19 Drawing Sheets

U.S. PATENT DOCUMENTS

| | | | |
|---|---|---|---|
| 3,883,002 A | 5/1975 | Moore | |
| 3,924,751 A | 12/1975 | Ballenger | |
| 3,934,436 A | 1/1976 | Candlin et al. | |
| 3,963,227 A | 6/1976 | Molders | |
| 3,976,200 A | 8/1976 | Munns | |
| 3,981,158 A | 9/1976 | Watson | |
| 4,091,488 A | 5/1978 | Artzberger | |
| 4,114,764 A | 9/1978 | Rich | |
| 4,116,341 A | 9/1978 | Hebda | |
| 4,156,523 A | 5/1979 | Bauer | |
| 4,160,390 A | 7/1979 | Spaetgens | |
| 4,194,731 A | 3/1980 | Marx | |
| 4,197,931 A | 4/1980 | Norcia | |
| 4,221,353 A | 9/1980 | Kuhn et al. | |
| 4,307,875 A | 12/1981 | Schnitzius et al. | |
| 4,343,404 A | 8/1982 | Folsom | |
| 4,400,129 A | 8/1983 | Eisenberg et al. | |
| 4,433,759 A | 2/1984 | Ichinose | |
| 4,573,854 A | 3/1986 | McFarland | |
| 4,595,182 A | 6/1986 | Freitag et al. | |
| 4,618,140 A | 10/1986 | Brown | |
| 4,700,845 A | 10/1987 | Fretter | |
| 4,749,089 A | 6/1988 | Stewart, III | |
| 4,779,845 A | 10/1988 | Bartesch et al. | |
| 4,808,056 A | 2/1989 | Oshima | |
| 4,813,550 A | 3/1989 | Saeks | |
| 4,852,842 A | 8/1989 | O'Neill | |
| 4,854,554 A | 8/1989 | Ludwig | |
| 4,901,594 A | 2/1990 | Selzer | |
| 5,083,729 A | 1/1992 | Saeks et al. | |
| 5,086,930 A | 2/1992 | Saeks | |
| 5,125,517 A | 6/1992 | Martinell | |
| 5,180,335 A | 1/1993 | Maucher et al. | |
| 5,183,162 A | 2/1993 | Ritzenthaler | |
| 5,209,628 A | 5/1993 | Hassell | |
| 5,257,767 A | 11/1993 | McConnell | |
| 5,294,006 A | 3/1994 | Deschino | |
| 5,354,035 A * | 10/1994 | Helgren | 254/399 |
| 5,407,261 A * | 4/1995 | Mercer | 312/248 |
| 5,433,376 A | 7/1995 | Kueshner | |
| 5,474,189 A | 12/1995 | Peterson | |
| 5,529,231 A | 6/1996 | Burgess | |
| 5,553,718 A | 9/1996 | Robar | |
| 5,638,559 A | 6/1997 | Natri et al. | |
| 5,642,820 A | 7/1997 | Angeles | |
| 5,662,256 A | 9/1997 | Bryan | |
| 5,664,687 A | 9/1997 | Liatti | |
| 5,702,091 A | 12/1997 | Perrin et al. | |
| 5,709,521 A | 1/1998 | Glass et al. | |
| 5,784,740 A | 7/1998 | DiSieno et al. | |
| 5,839,719 A | 11/1998 | Hosan et al. | |
| 5,845,831 A | 12/1998 | Nusbaum et al. | |
| 5,860,440 A | 1/1999 | Murray et al. | |
| 6,000,071 A | 12/1999 | Fettes | |
| 6,082,552 A | 7/2000 | Pollock et al. | |
| 6,095,344 A | 8/2000 | White | |
| 6,105,795 A | 8/2000 | Terragni | |
| 6,161,702 A * | 12/2000 | Campbell | 211/17 |
| 6,163,913 A | 12/2000 | DiSieno et al. | |
| 6,199,735 B1 | 3/2001 | Cothern et al. | |
| 6,269,958 B1 | 8/2001 | Pollock et al. | |
| 6,279,932 B1 | 8/2001 | White et al. | |
| 6,302,278 B1 | 10/2001 | Dueck | |
| 6,648,148 B1 * | 11/2003 | Bally | 211/18 |
| 6,691,878 B1 * | 2/2004 | Ouitz | 211/104 |

FOREIGN PATENT DOCUMENTS

| | | |
|---|---|---|
| GB | 2045707 | 11/1980 |
| WO | WO 91/05693 | 5/1991 |

* cited by examiner

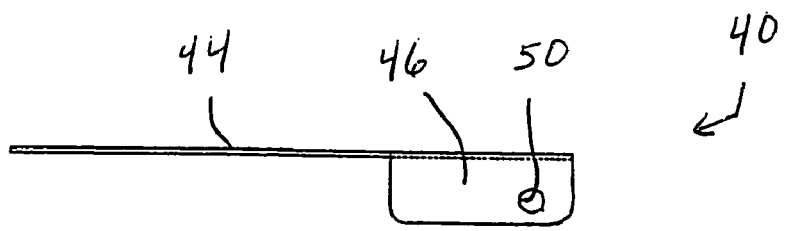
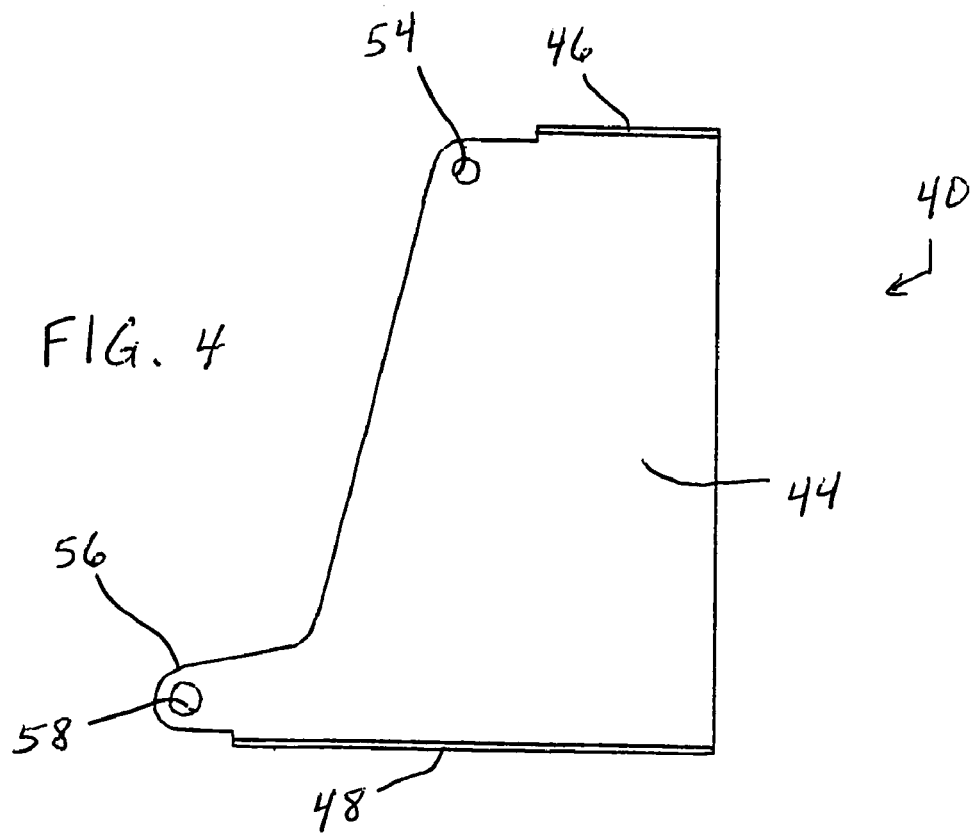
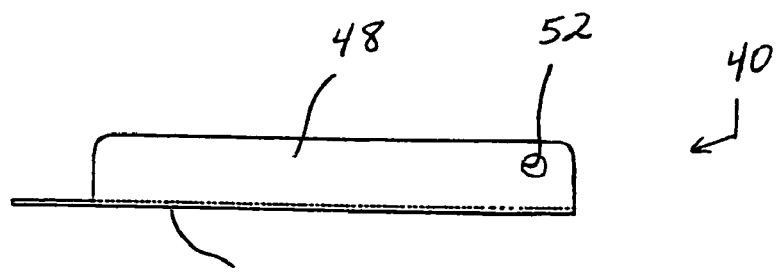

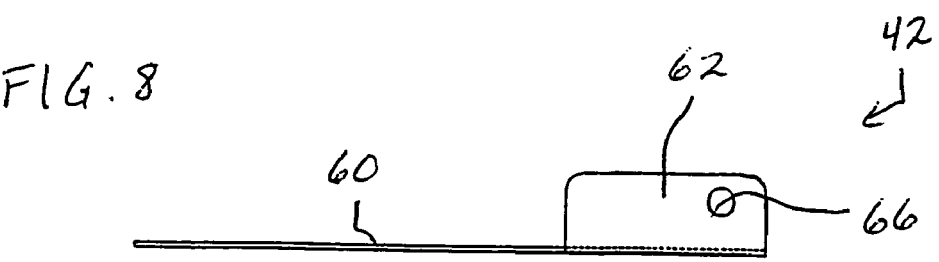
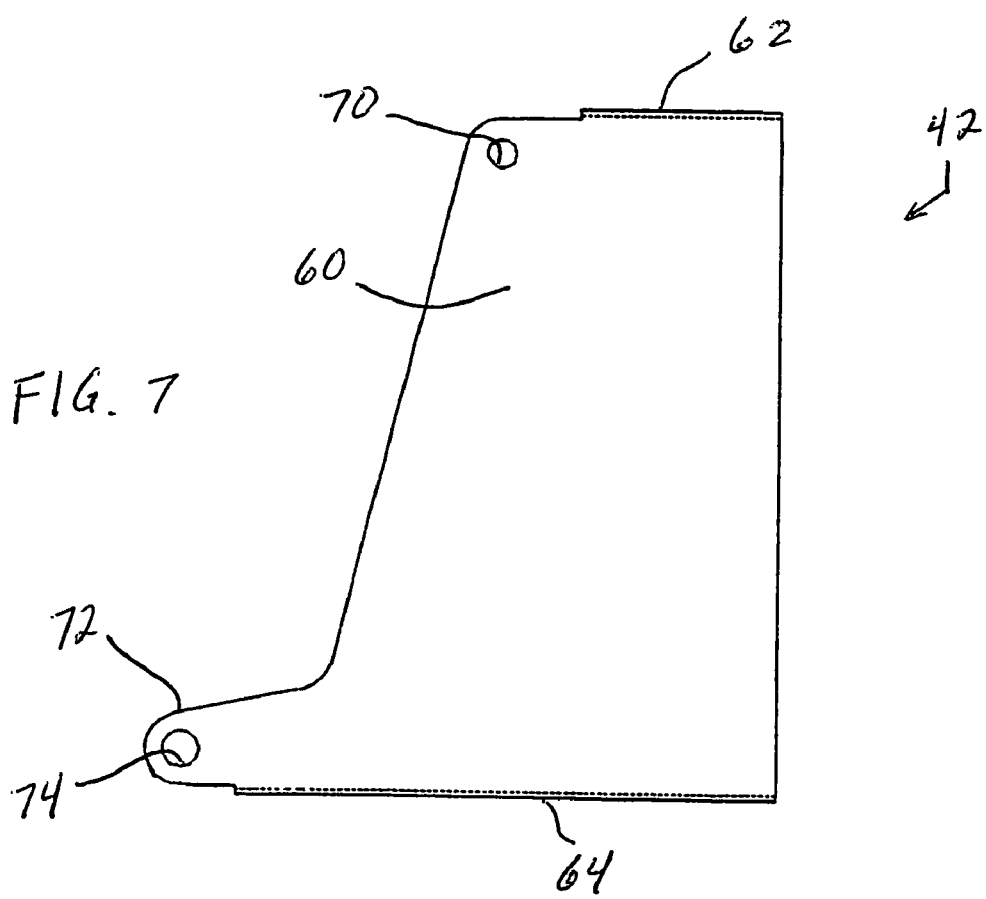
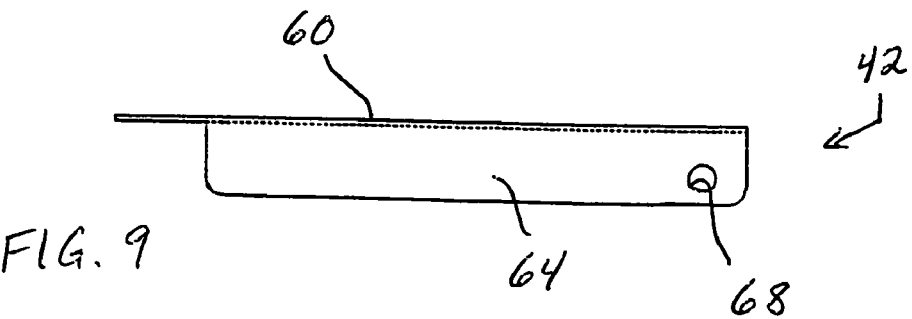

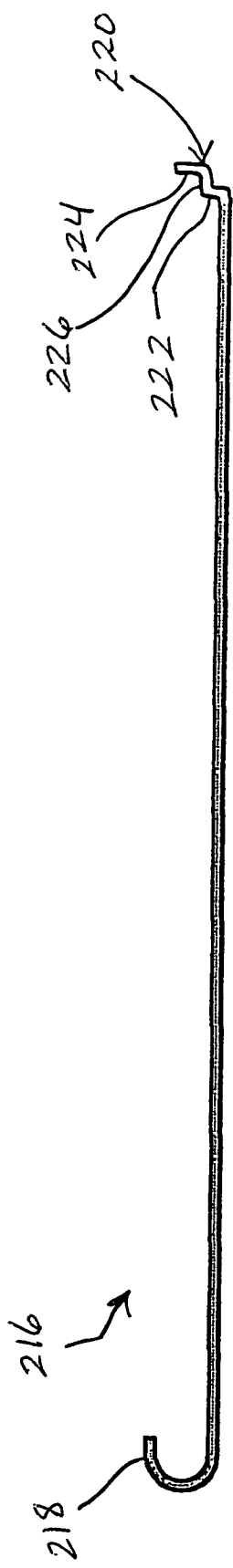
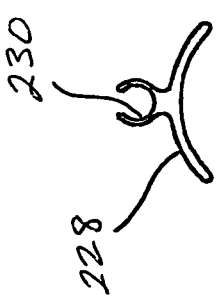
FIG. 30
FIG. 31

MOUNTED STORAGE DEVICE

CROSS-REFERENCE TO RELATED APPLICATION

This application claims the benefit of U.S. provisional application Ser. No. 60/523,956, filed on Nov. 21, 2003.

BACKGROUND OF THE INVENTION

This invention relates in general to storage devices, and in particular to a mounted storage device for lifting and storing an object such as a bicycle.

Bicycles and other objects are often stored in confined areas, such as garages or patios. The available storage space in these areas is usually limited. Consequently, it may be difficult to find enough space for storing the objects. Another problem is that storing additional objects in the area may interfere with the use of objects currently located in the area. For example, storing a bicycle near a workbench in a garage may interfere with the use of the workbench. Unused space is often available on the upper portions of walls in the area. However, gaining access to this unused space for storage can be difficult.

A person can sometimes store an object on the upper portion of a wall by lifting the object and mounting it on the wall. However, lifting a relatively heavy object to an elevated storage position can cause stress and strain on the human body. Some people may be unable to lift a relatively heavy object to an elevated position. Even if someone is capable of lifting an object to store it on the wall, someone else less capable may be the next one who wants to remove it from the wall. The use of a ladder to reach the elevated position presents safety issues, because it is awkward to lift a relatively heavy object while positioned on the ladder. It is also difficult for a person to hold the object in the elevated position while simultaneously mounting the object on the wall.

Some devices, such as a block and tackle, are known for lifting objects. Unfortunately, currently available devices are not totally satisfactory for lifting an object such as a bicycle to an elevated storage position. The current devices suffer from drawbacks in the areas of ease of installation and use, controllability, reliability, cost or other areas. Some devices require an external power source. There is no widely accepted alternative to human-powered lifting available in the marketplace today.

U.S. Pat. Nos. 6,082,552, 6,269,958 B1 and 6,648,148 B1 issued to Pollock et al. describe improved wall-mounted storage devices. Nevertheless, it would still be advantageous to provide additional improvements in a storage device having excellent performance which is relatively simple in design and can be manufactured at a relatively low cost.

SUMMARY OF THE INVENTION

This invention relates to a mounted storage device. The storage device includes a mount for mounting the device on a vertical surface such as a wall. A load arm is supported on the mount and structured to support an object thereon. The load arm is movable between a load position for loading the object on the load arm and a store position for storing the supported object. The storage device also includes a force device connected between the mount and the load arm. The force device creates a force urging the load arm in a direction from the load position to the store position. The storage device further includes a resistance damper connected between the mount and the load arm. The resistance damper resists movement of the load arm in both directions between the load position and the store position. The resistance damper includes a plurality of damper members. The resistance damper creates the resistance by at least one of friction and compression tension between the damper members.

Various advantages of this invention will become apparent to those skilled in the art from the following detailed description of the preferred embodiment, when read in light of the accompanying drawings.

BRIEF DESCRIPTION OF THE DRAWINGS

FIG. 4 is a side view of a first side plate of the storage device.

FIG. 5 is a top view of the side plate of FIG. 4.

FIG. 6 is a bottom view of the side plate of FIG. 4.

FIG. 7 is a side view of a second side plate of the storage device.

FIG. 8 is a top view of the side plate of FIG. 7.

FIG. 9 is a bottom view of the side plate of FIG. 7.

FIG. 30 is a side view of a release rod of the storage device.

FIG. 31 is a front view of a rod clip of the storage device.

DETAILED DESCRIPTION OF THE PREFERRED EMBODIMENT

Figure 1:
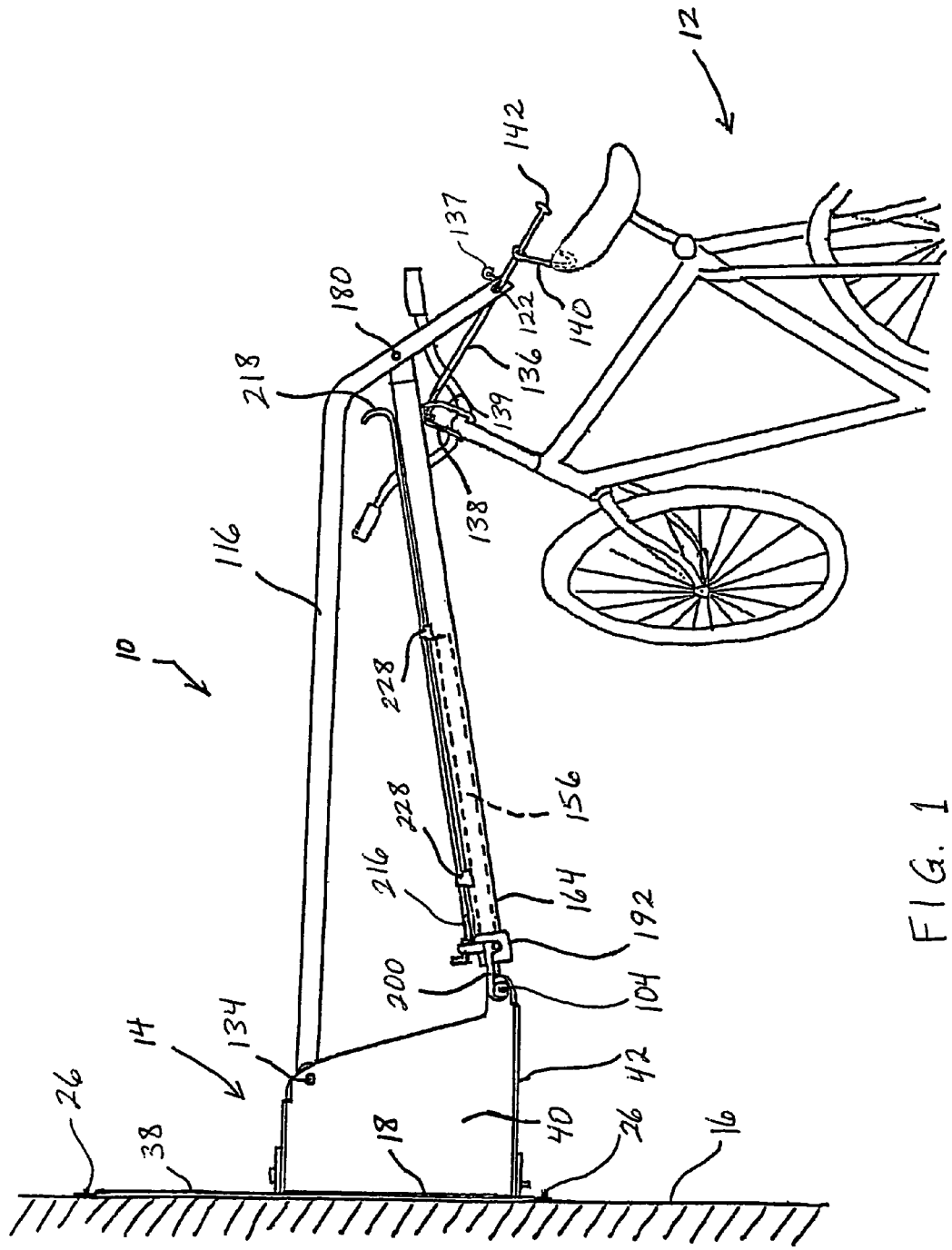
FIG. 1 is a side view of a mounted storage device according to the invention, the storage device shown in a load position.

Referring now to the drawings, there is illustrated in FIG. 1 a mounted storage device 10 according to the invention. The storage device 10 can be used for lifting and storing any object requiring storage, particularly in a confined area such as a garage or patio. In one embodiment, the storage device 10 is used for lifting and storing a bicycle 12.

The storage device 10 includes a mount 14 for mounting the device on any vertical surface, such as a wall 16, a post, a pillar, a stud or a beam. Any type of mount can be used that provides a connection to the vertical surface having suitable strength and stability for supporting the device and the stored object. The mount can provide a rigid connection or a movable connection between the storage device and the vertical surface. In the illustrated embodiment, the mount 14 comprises a hinged mounting assembly that allows the storage device 10 to be pivoted from side to side on the wall 16. The primary benefit of a hinged mounting assembly is that if someone or something bumps into the storage device, it will pivot away and thereby minimize injury to the person, damage to the object striking the storage device, damage to the storage device itself, and/or damage to the wall anchors at the mount.

Figure 2:
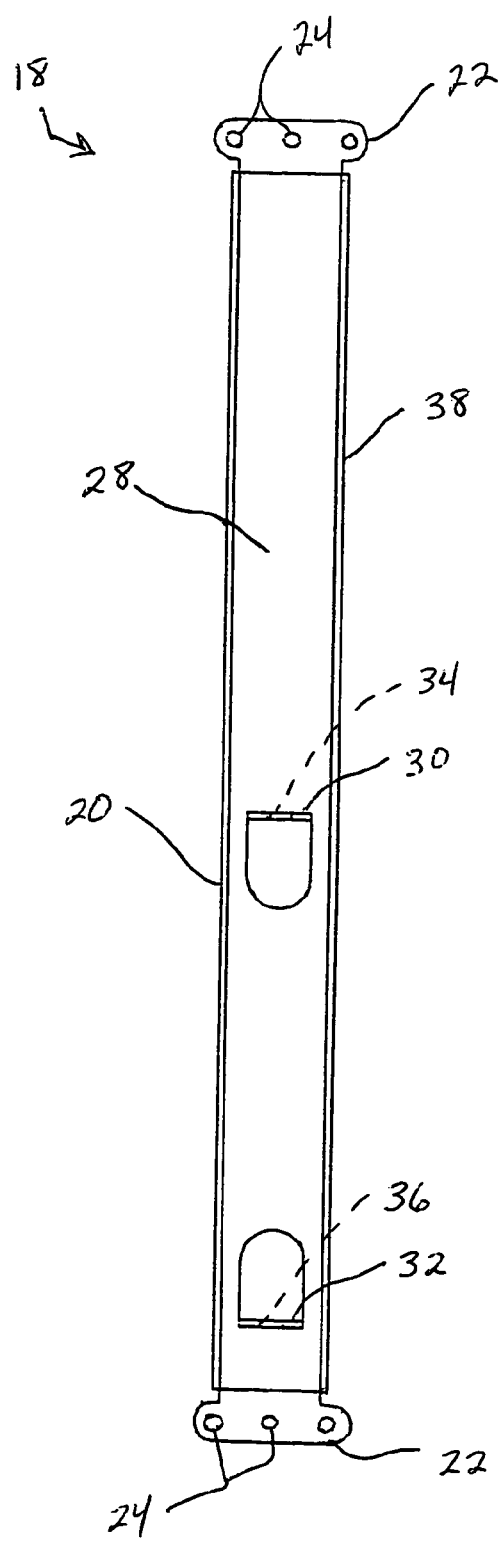
FIG. 2 is a front view of a channel of the storage device.
Figure 3:
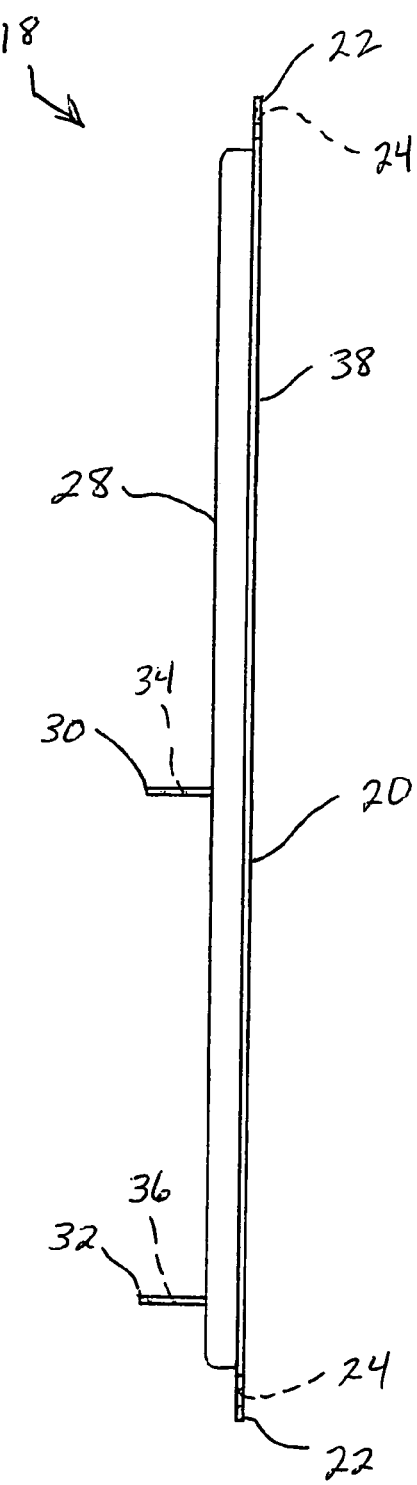
FIG. 3 is a side view of the channel.

As shown in FIGS. 1–3, the mounting assembly includes a channel 18. The channel 18 includes a channel body 20 and flat mounting pads 22 at the top and bottom of the channel body. The mounting pads 22 have mounting holes 24 therethrough for the insertion of any suitable fasteners, such as wall anchors 26, to attach the channel 18 to the wall 16. The center 28 of the channel body 20 of the channel 18 is raised along its length to create a generally U-shaped cross-section, which increases the strength of the channel. The channel 18 also includes upper and lower ears 30 and 32 that extend perpendicularly outward from the channel body 20. The ears 30 and 32 have pivot holes 34 and 36 therethrough for mounting the other parts of the storage device to the channel, as described below. The upper ear 30 is located near the center of the channel 18, and the lower ear 32 is located near the bottom of the channel. The channel 18 includes an upwardly extending portion 38 which extends up the wall 16 from the ears 30 and 32 when the channel is mounted on the wall. The upwardly extending portion 38 of the channel 18 increases the holding force of the wall anchors 26, which allows the mount 14 to be conveniently mounted on drywall instead of on a wall stud. Optionally, the channel 18 can include tabs (not shown) extending transversely from the channel body 20 to increase the lateral stability of the storage device 10.

As shown in FIGS. 1 and 4–9, the mounting assembly also includes first and second side plates 40 and 42. The side plates 40 and 42 are hingedly mounted on the channel 18. As shown in FIGS. 4–6, the first side plate 40 includes a plate portion 44, a relatively short upper flange 46 extending transversely from the upper end of the plate portion 44, and a relatively long lower flange 48 extending transversely from the lower end of the plate portion 44. In FIG. 4, the upper and lower flanges 46 and 48 extend toward the viewer (out of the paper). The upper and lower flanges 46 and 48 have pivot holes 50 and 52 therethrough near the proximal end of each flange. The first side plate 40 has a pivot hole 54 through its upper distal corner. The first side plate 40 includes an extension 56 in its lower distal corner, and a pivot hole 58 through the extension.

As shown in FIGS. 7–9, the second side plate 42 includes a plate portion 60, a relatively short upper flange 62 extending transversely from the upper end of the plate portion 60, and a relatively long lower flange 64 extending transversely from the lower end of the plate portion 60. In FIG. 7, the upper and lower flanges 62 and 64 extend away from the viewer (into the paper). The upper and lower flanges 62 and 64 have pivot holes 66 and 68 therethrough near the proximal end of each flange. The second side plate 42 has a pivot hole 70 through its upper distal corner. The second side plate 42 includes an extension 72 in its lower distal corner, and a pivot hole 74 through the extension.

Figure 19:
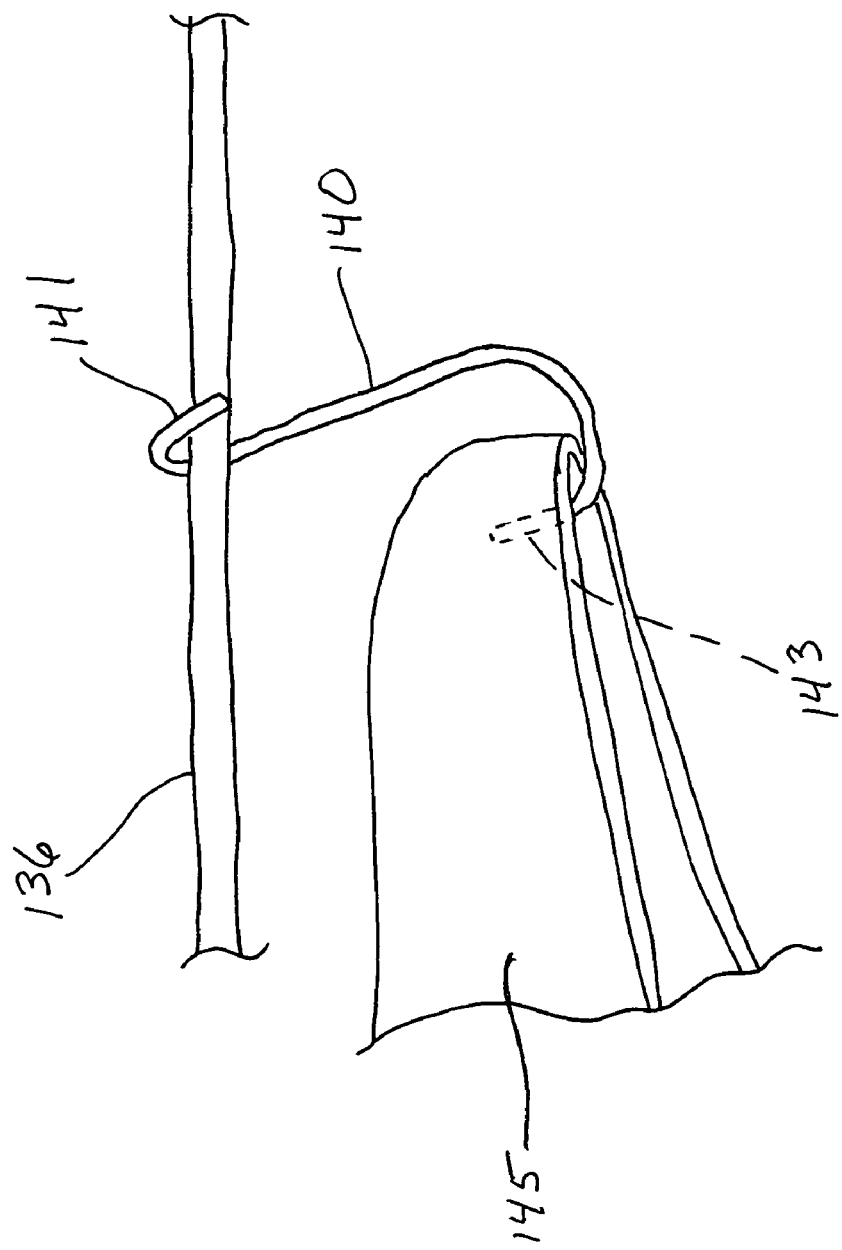
FIG. 19 is a side view of a bicycle seat supported on the seat hook, and the seat hook attached to the support rod.

As best shown in FIG. 19, the second side plate 42 is slightly larger than the first side plate 40, so that the upper and lower flanges 62 and 64 of the second side plate 42 are positioned just above and below the upper and lower flanges 46 and 48 of the first side plate 40 when the side plates are brought together at their proximal ends for mounting on the channel 18. In this position, the pivot hole 66 in the upper flange 62 of the second side plate 42 is aligned with the pivot hole 50 in the upper flange 46 of the first side plate 40, and both pivot holes are aligned with the pivot hole 34 in the upper ear 30 of the channel 18. Similarly, the pivot hole 68 in the lower flange 64 of the second side plate 42 is aligned with the pivot hole 52 in the lower flange 48 of the first side plate 40, and both pivot holes are aligned with the pivot hole 36 in the lower ear 32 of the channel 18. Upper and lower hinge pins 76 and 78 are inserted through the aligned holes to pivotably connect the first and second side plates 40 and 42 to the channel 18. Alternatively, rivets or similar fasteners could be used instead of the hinge pins; this would allow the storage device 10 to be shipped to the customer with the side plates 40 and 42 already assembled on the channel 18.

Figure 11:
FIG. 11 is a cross-sectional view taken along line 11—11 of FIG. 10.
Figure 10:
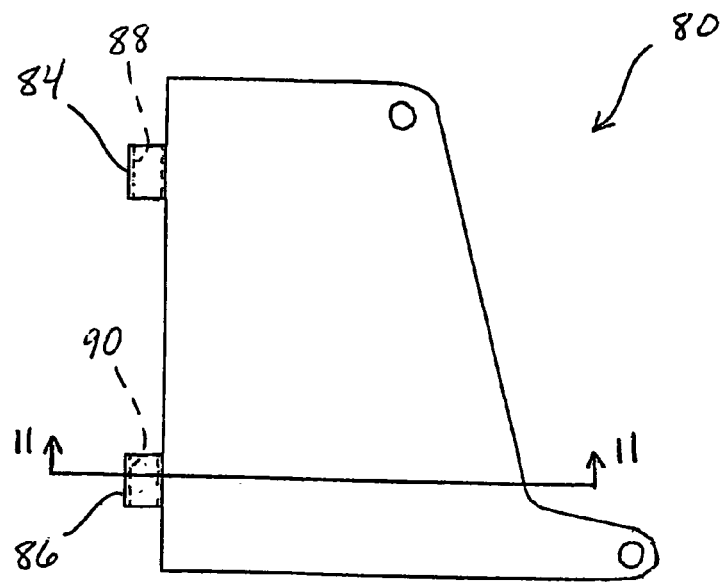
FIG. 10 is a side view of an alternate embodiment of a first side plate of the storage device.
Figure 12:
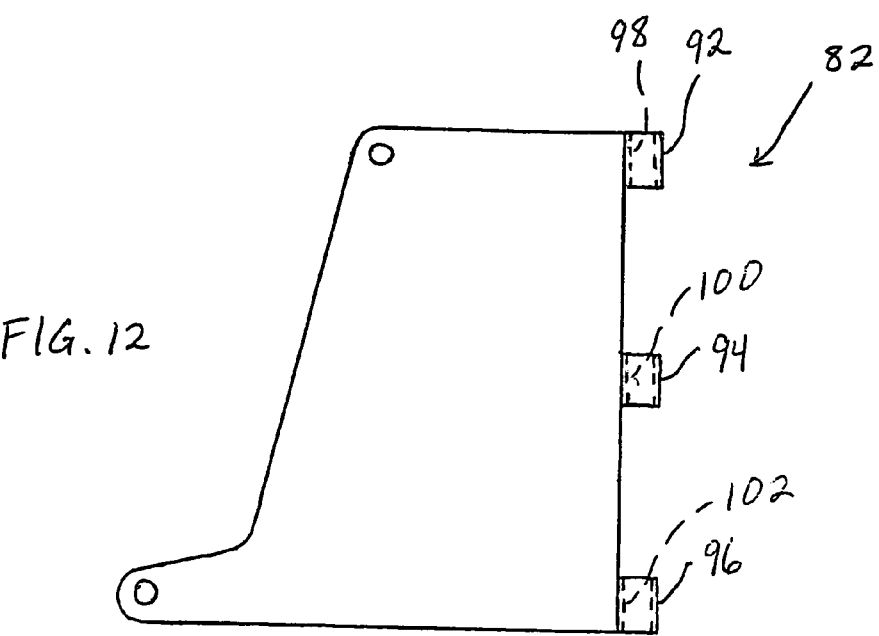
FIG. 12 is a side view of an alternative embodiment of a second side plate of the storage device.

FIGS. 10–12 illustrate an alternate embodiment of first and second side plates 80 and 82 having a hinge structure which is different from that described above. The first side plate 80 includes upper and lower curved portions 84 and 86 extending from the proximal side of the plate. The curved portions 84 and 86 form hinge knuckles having pivot openings 88 and 90 therethrough. The second side plate 82 includes upper, middle and lower curved portions 92, 94 and 96 extending from the proximal side of the plate. The curved portions 92, 94 and 96 form hinge knuckles having pivot openings 98, 100 and 102 therethrough. When the first and second side plates 80 and 82 are brought together at their proximal ends for mounting on the channel 18, the upper and lower curved portions 92 and 96 of the second side plate 82 are positioned just above and below the upper and lower curved portions 84 and 86 of the first side plate 80. The pivot openings 94, 96 and 98 of the second side plate 82 are aligned with the pivot openings 88 and 90 of the first side plate 80, and the pivot openings are aligned with the pivot holes 34 and 36 in the upper and lower ears 30 and 32 of the channel 18. A hinge pin (not shown) is inserted through the holes and the openings to create a hinged connection between the first and second side plates 80 and 82 and the channel 18.

Figure 13:
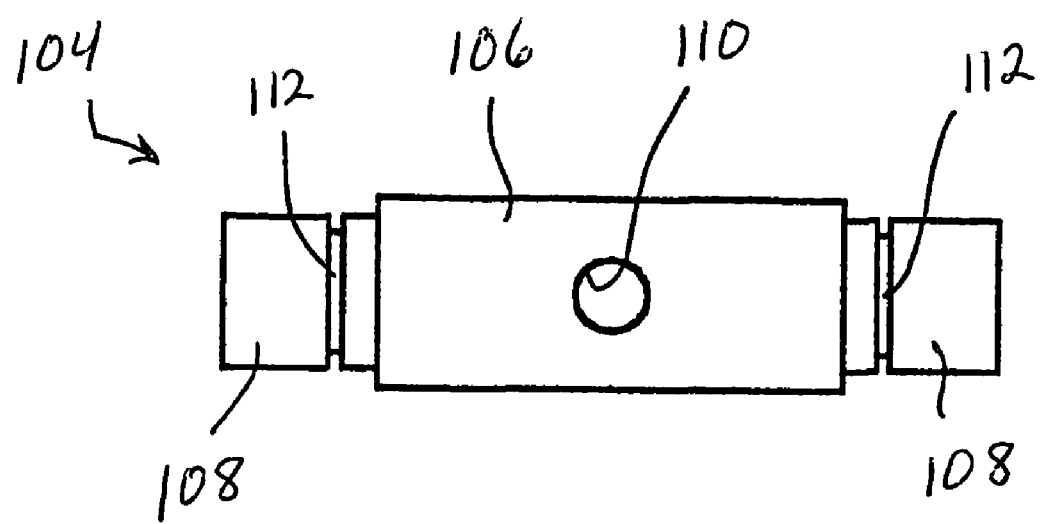
FIG. 13 is a front view of a pivot axle of the storage device.
Figure 14:
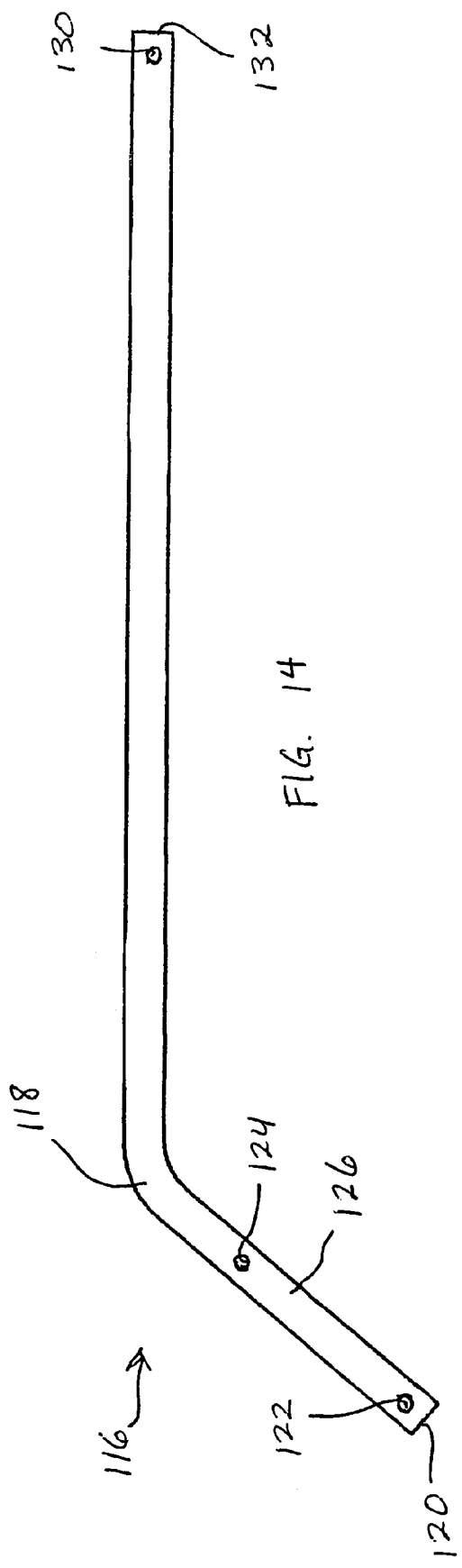
FIG. 14 is a side view of a load arm of the storage device of FIG. 1.
Figure 15:
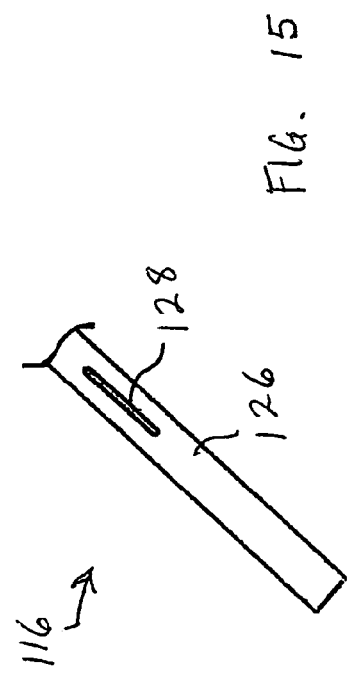
FIG. 15 is a bottom view of the distal portion of the load arm.
Figure 16:
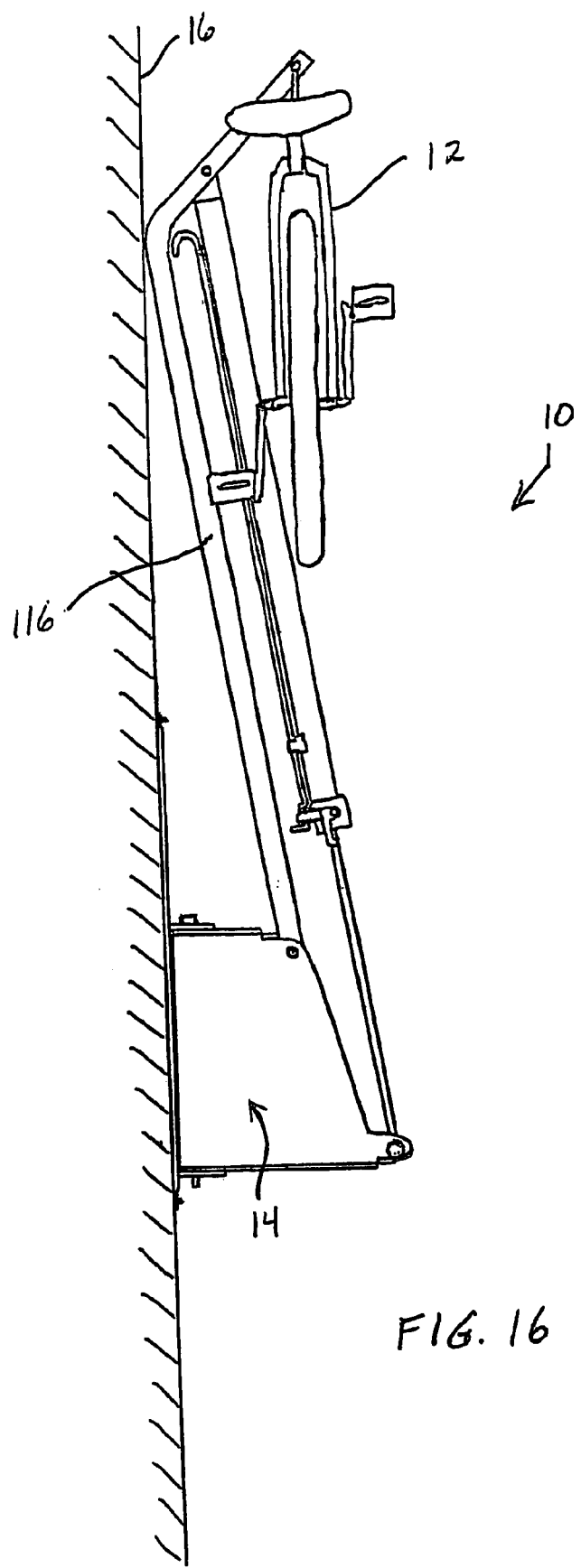
FIG. 16 is a side view of the storage device in a store position.
Figure 20:
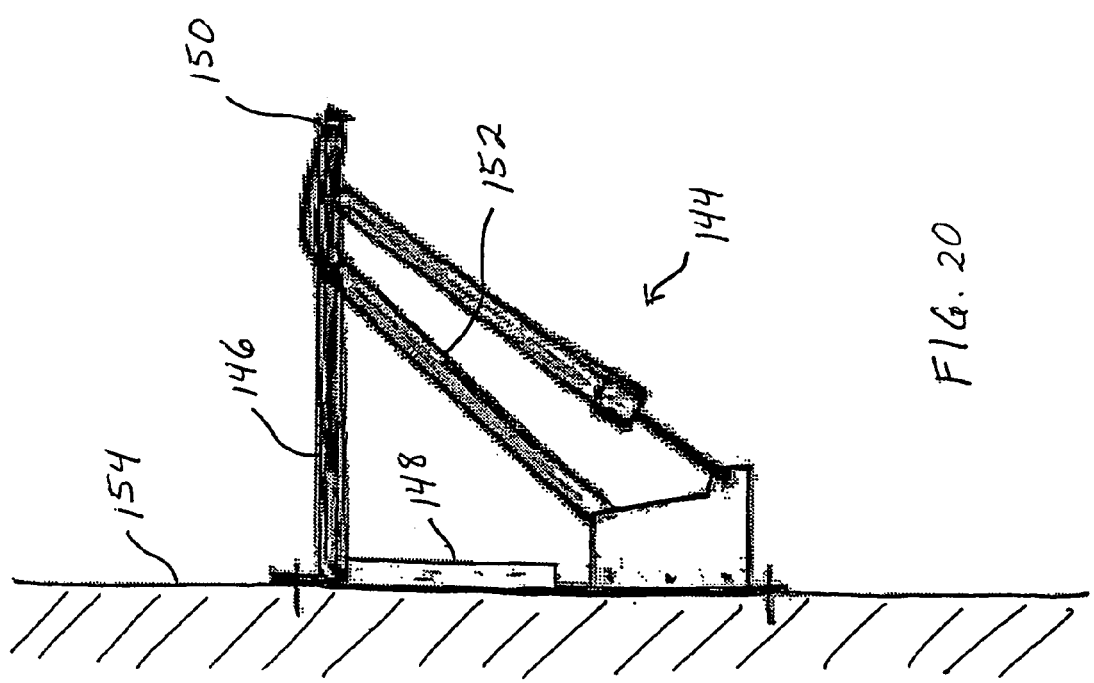
FIG. 20 is a side view of an alternate embodiment of the storage device including a pair of braces.

As shown in FIGS. 1, 13 and 20, the mounting assembly also includes a pivot axle 104 which is mounted between the extensions 56 and 72 of the first and second side plates 40 and 42. The pivot axle 104 is generally cylindrical in shape, including a central portion 106 and reduced diameter end portions 108. A threaded hole 110 is formed through the middle of the central portion 106. A groove 112 is formed around each of the end portions 108 a short distance from the central portion 106. When the pivot axle 104 is mounted between the extensions 56 and 72 of the first and second side plates 40 and 42, the end portions 108 of the pivot axle 104 extend through the pivot holes 58 and 74 (FIGS. 4 and 6) in the extensions. The end portions 108 have a diameter which is slightly smaller than the diameter of the pivot holes 58 and 74, so that the pivot axle 104 can pivot in the pivot holes. The grooves 112 in the end portions 108 are positioned just outside the pivot holes 58 and 74. E-rings 114, one of which is shown in FIG. 20, are inserted into the grooves 112 to hold the pivot axle 104 in place.

In an alternate embodiment (not shown), holes are formed through the upper and lower flanges of the first and second side plates. The hole in each flange is located at the end of the flange opposite the pivot hole. The first and second side plates are assembled together with the pivot axle, and then fasteners (e.g., plastic dart rivets) are inserted in the aligned upper flange holes and the aligned lower flange holes. This method holds the assembly together and thereby eliminates the need for the E-rings and the grooves. This is less expensive overall and it also makes it easier to handle the assembly when installing the hinge pins.

The channel 18, first and second side plates 40 and 42, and pivot axle 104 can be made from any material(s) having a suitable strength for supporting the storage device 10 and the stored object. For example, they can be made from a high strength metal or a reinforced plastic material. In one embodiment, the channels, side plates, and pivot axle are made from carbon steel.

As shown in FIGS. 1 and 14–16, the storage device 10 also includes a load arm 116 which is movably supported on the mount 14. The load arm 116, in turn, supports the object to be stored (e.g., the bicycle 12) on the storage device 10. The load arm 116 is movable between a load position (shown in FIG. 1) for loading the object on the load arm, and a store position (shown in FIG. 16) for storing the supported object up against the wall 16. In the illustrated embodiment, the load position of the load arm 116 is approximately horizontal, and it is almost fully down. (As described below, the load arm can be pushed down slightly from the load position to an unlock position.) In the store position, the load arm 116 is raised over the top and then back a short distance against the wall 16 so that the stored object remains in place against the wall.

The load arm 116 can be a single member that is structured to support the object to be stored, or it can be part of a load arm assembly that includes a separate support structure attached to the load arm. The term "load arm", as used herein, refers to both structures. Any type of load arm suitable for being supported on the mount and for supporting the object to be stored can be used. In the illustrated embodiment, a load arm assembly includes the load arm 116 which is pivotably mounted on the mount 14. The illustrated load arm 116 is an extended piece of tubing having a bend 118 a short distance from its distal end 120. The load arm 116 has a pair of holes 122 through opposing sides of the tubing at the distal end 120 of the arm. The load arm 116 has another pair of holes 124 through opposing sides of the tubing in the distal portion 126 of the tubing. The load arm 116 has a slot 128 through the bottom of the tubing at the same location.

The load arm 116 has a pair of pivot holes 130 through opposing sides of the tubing at its proximal end 132. The load arm 116 is mounted on the mount 14 by positioning the proximal end 132 between the upper distal corners of the first and second side plates 40 and 42, and inserting a suitable fastener 134, such as a bolt, through the aligned pivot holes 130, 54 and 70 of the load arm and the side plates. The load arm 116 can pivot up and down on the fastener 134.

Figure 17:
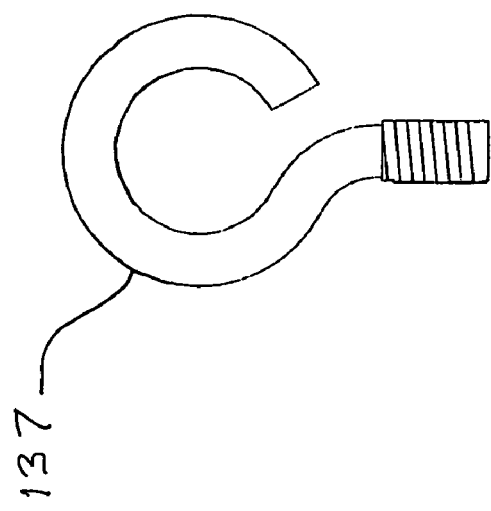
FIG. 17 is a side view of an eyebolt for use in locking a support rod in place relative to the load arm.

The illustrated load arm assembly also includes a support structure attached to the load arm 116 and structured to support the object to be stored. Any suitable type of support structure can be used. In the illustrated embodiment, the support structure includes a support rod 136. The support rod 136 slides through the holes 122 in the distal end 120 of the load arm 116 and extends transversely to the load arm. After the object, such as the bicycle 12 shown in FIG. 1, is mounted on the support rod 136, the rod can be slid back and forth to find the balance point of the object (the point at which the weight of the object is centered relative to the load arm). The support rod 136 is then locked in place using any suitable locking structure. For example, it can be locked in place with an eyebolt 137 that is screwed through a threaded hole in the end of the load arm and into engagement with the support rod 136 to lock it in place. FIG. 17 shows an example of a suitable eyebolt 137. Alternatively, a hand knob or a hand screw can be used for locking the support rod in place.

The illustrated support structure also includes a pair of handlebar hooks 138 and 139. The handlebar hooks 138 and 139 are hooked onto the handlebars of the bicycle, and then used to lift the front part of the bicycle so that the hooks can be attached to the support rod 136. This is easier than attaching the hooks 138 and 139 to the support rod 136 and then lifting the bicycle onto the hooks, although it could also be done in that manner.

Figure 18:
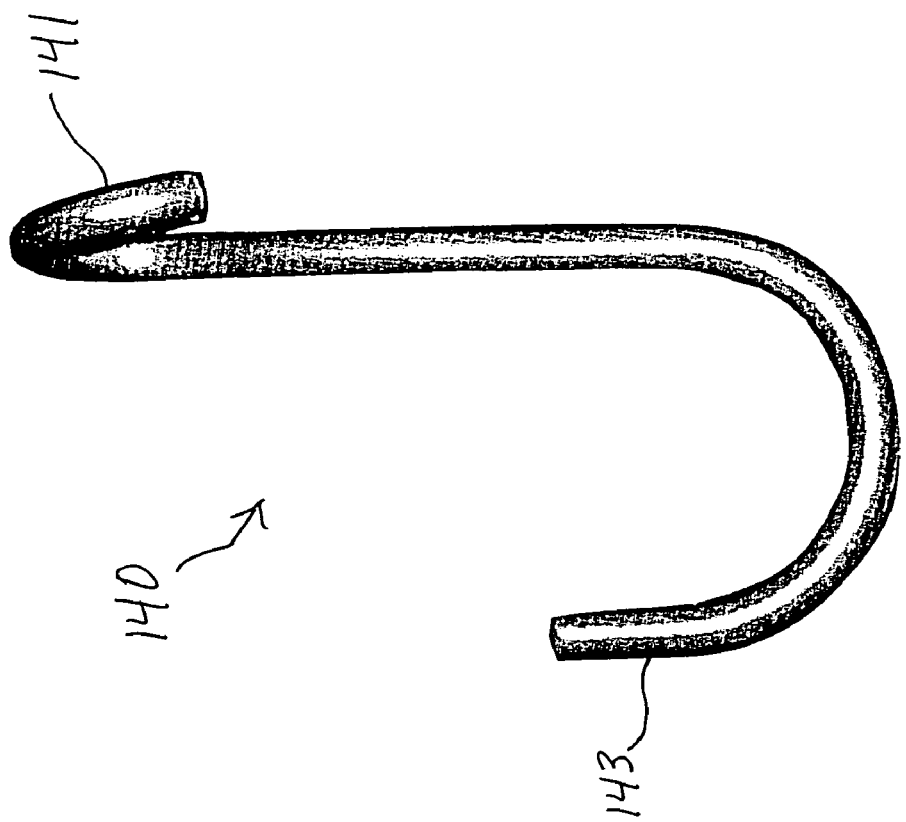
FIG. 18 is a side view of a seat hook for use in supporting a bicycle seat on the support rod.

The illustrated support structure also includes a seat hook 140. FIG. 18 shows an example of a suitable seat hook 140. The seat hook 140 includes a relatively small upper hook portion 141 and a relatively large lower hook portion 143. The seat hook 140 is attached to the support rod 136, with the support rod extending through the upper hook portion 141. The seat hook 140 can be slid back and forth on the support rod 136 in order to position it correctly under the seat of the bicycle. FIG. 19 illustrates a bicycle seat 145 supported on the lower hook portion 143 of the seat hook 140. The upper hook portion 141 of the seat hook 140 is tipped at an angle away from the lower hook portion 143 so that the weight of the bicycle causes the upper hook portion to bind on the support rod 136. This helps to stabilize the bicycle on the support rod 136.

The support rod 136 can be provided with lips 142 on its ends, for example by attaching oversize washers to the ends of the rod, to prevent the hooks from accidentally sliding off the rod.

The load arm 116 and the support rod 136 can be made from any material(s) having a suitable strength for supporting the storage device 10 and the stored object. For example, they can be made from a high strength metal or a reinforced plastic material. In one embodiment, the load arm 116 is made from steel tubing, and the support rod 136 is a solid steel rod.

Figure 21:
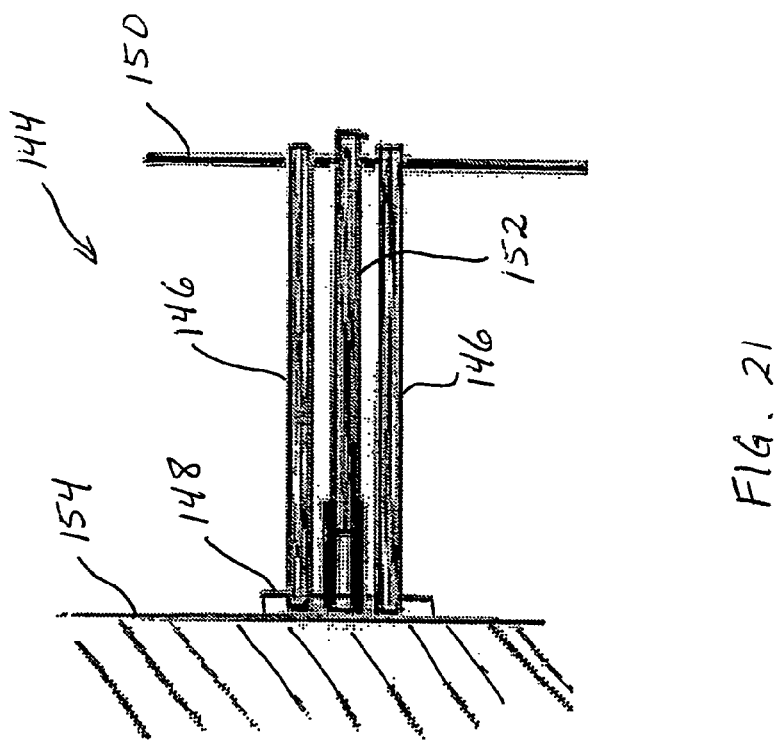
FIG. 21 is a top view of the storage device of FIG. 20.

FIGS. 20 and 21 show an embodiment of the storage device 144 which includes a brace 146 connectable between the mount 148 and the support structure 150 to lock the support structure in a desired position. For example, the support structure can be locked at a height (e.g., about 6 feet) suitable for use as a work stand for a bicycle, so that a person can work on the bicycle without having to bend over or kneel. Any suitable brace(s) can be used for this purpose. In the illustrated embodiment, a pair of braces 146 are attached between the mount 148 and the support structure 150 on opposing sides of the load arm 152. The braces 146 can be attached by any suitable means, for example, by the use of bolts or other fasteners. The braces 146 on opposing sides of the load arm 152 provide a symmetrical, stable attachment of the support structure 150 to the wall 154. The braces could optionally include a bend (not shown) to increase the width of the attachment to the wall, in order to provide even more stability.

Figure 22:
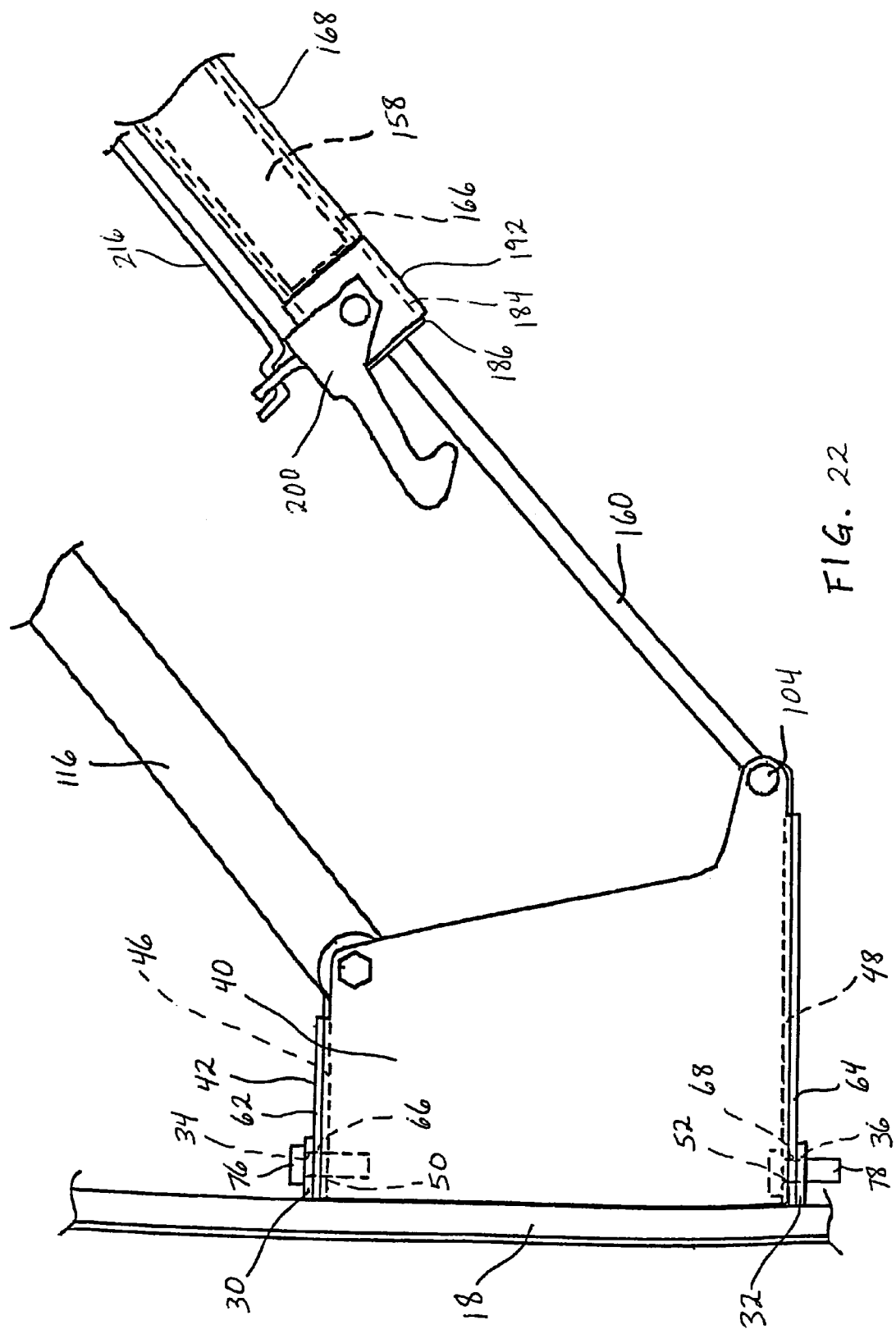
FIG. 22 is a side view of part of the storage device of FIG. 1, showing an extended piston of a gas spring.
Figure 23:
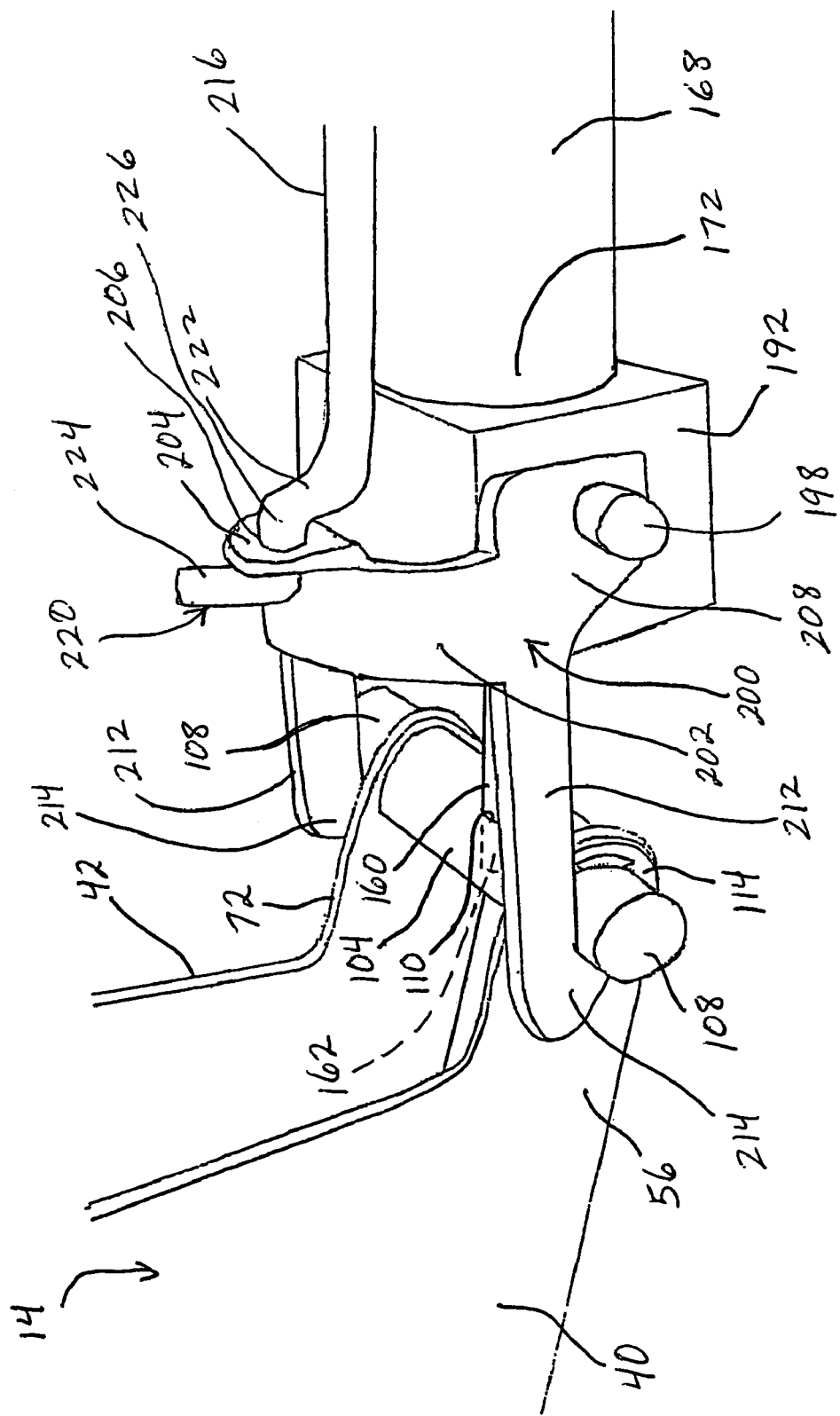
FIG. 23 is a perspective view of part of the storage device, showing a latch in a locked position.

As shown in FIGS. 1, 22 and 23, the storage device 10 also includes a force device 156 which is connected between the mount 14 and the load arm 116. The force device 156 creates a force urging the load arm 116 in a direction from the load position to the store position (an upward direction in the illustrated embodiment). Any suitable type of force device can be used for this purpose. For example, the force device can be a spring device, including any of a variety of devices operated by mechanical or pneumatic spring action. In the illustrated embodiment, the force device is a gas spring 156 which includes a cylinder 158 containing pressurized gas, and a piston 160 telescopically disposed within the cylinder. Any suitable gas spring can be used in the device. In one embodiment, the type of gas spring used is a self-contained, hermetically sealed hydropneumatic linear actuator containing pressurized nitrogen gas which provides an output force.

In the illustrated embodiment, the piston 160 of the gas spring 156 is pivotably connected to the mount 14. The piston 160 has a threaded end portion 162 which is screwed into the threaded hole 110 in the middle of the pivot axle 104 of the mount 14. The cylinder 158 of the gas spring 156 is disposed inside another member of the storage device 10, as described below. The pressurized gas inside the cylinder 158 urges the piston 160 to extend out of the cylinder. The extension of the piston 160 urges the load arm 116 in the upward direction. The piston 160 and the pivot axle 104 pivot together as one unit as the piston urges the load arm 116 upward. A downward force can be applied to the load arm 116 to push the piston 160 back into the cylinder 158.

As shown in FIGS. 1 and 24–26, the storage device also includes a resistance damper 164 connected between the mount 14 and the load arm 116. The resistance damper 164 resists movement of the load arm in both directions between the load position and the store position (in both upward and downward directions in the illustrated embodiment). The resistance damper 164 provides resistance for raising and lowering of the empty load arm 116, so that the load arm moves smoothly when lifted upward, and the load arm does not free fall downward when lowered.

The resistance damper 164 includes a plurality of damper members. The resistance damper creates the resistance by friction and/or compression tension between the damper members. Any suitable damper members can be used for this purpose. In the illustrated embodiment, the damper members are inner and outer tubes 166 and 168 that are telescopically disposed relative to one another, and a resistance material 170 between the tubes that creates resistance between them when they are extended or retracted relative to one another. Any suitable material can be used for this purpose. In a preferred embodiment, the resistance material 170 is a piece of hook and loop type fastening material (e.g., VELCRO®) attached to one of the tubes. For example, the material can be a strip of ½" or 1" wide VELCRO having a self-adhesive backing which is adhered to the outer surface of the inner tube. The VELCRO 170 creates both friction and compression tension between the inner and outer tubes 166 and 168 when they are extended or retracted relative to one another. The use such a material in the resistance damper 164 provides a side benefit of quieting the movement of the damper when the storage device is used.

The inner and outer tubes 166 and 168 can have any suitable structure. In the embodiment shown in FIG. 26, the outer tube 168 is a straight, hollow tube having an open proximal end 172. The distal end 174 of the outer tube 168 tapers into a flat portion 176 having a hole 178 therethrough. The distal end 174 of the outer tube 168 is connected to the distal portion 126 of the load arm 116 by inserting the flat portion 176 through the slot 128 in the bottom of the load arm 116, aligning the hole 178 in the flat portion 176 of the outer tube 168 with the holes 124 through the distal portion 126 of the load arm 116, and inserting a suitable fastener 180, such as a bolt, through the aligned holes.

Figure 25:
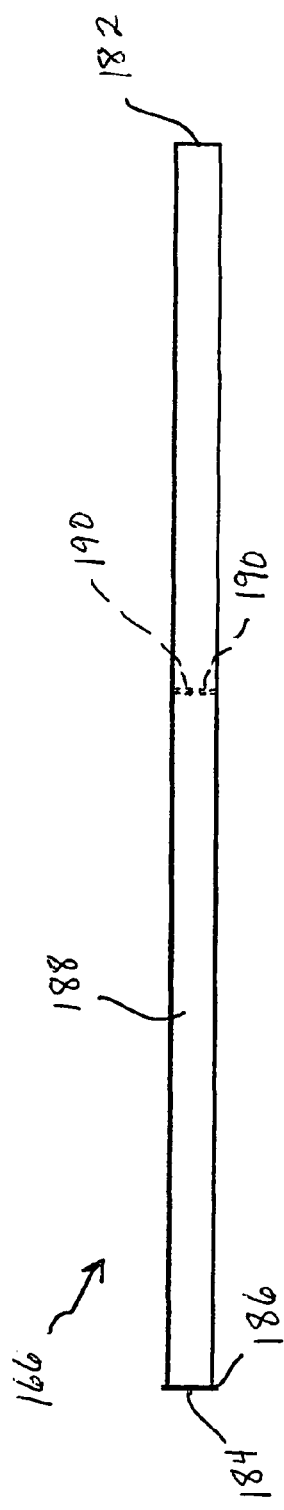
FIG. 25 is a side view of the inner tube.
Figure 26:
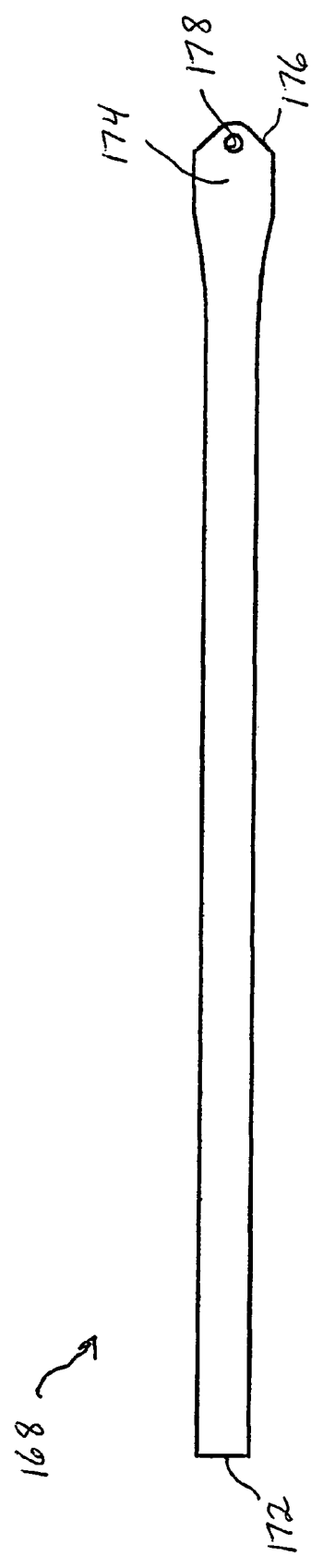
FIG. 26 is a side view of the outer tube.
Figure 27:
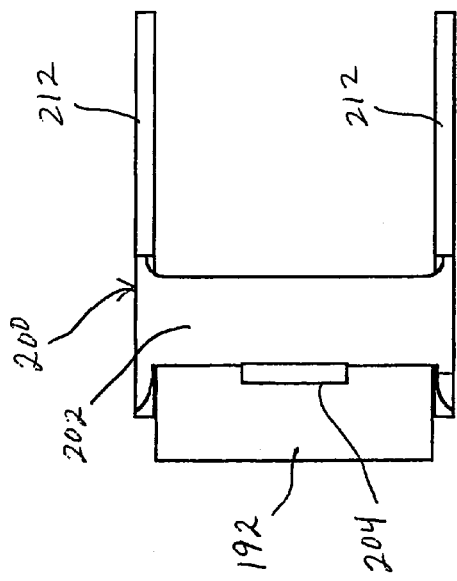
FIG. 27 is a front view of a latch and a latch block of the storage device
Figure 28:
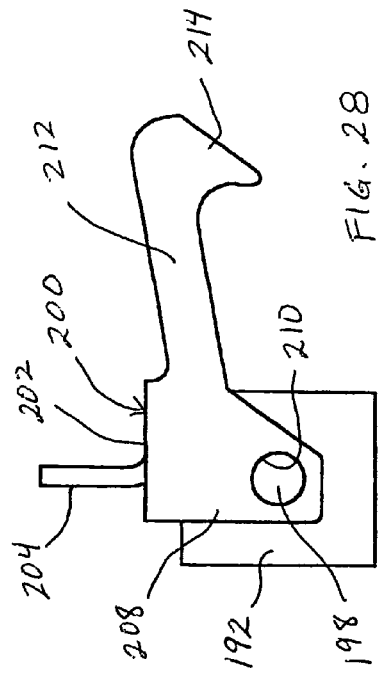
FIG. 28 is a side view of the latch and latch block.
Figure 29:
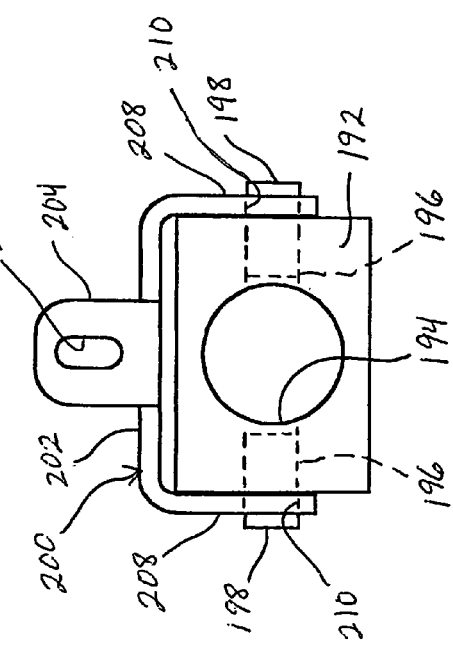
FIG. 29 is a top view of the latch and latch block.

In the embodiment shown in FIG. 25, the inner tube 166 is a straight, hollow tube having an open distal end 182. The inner tube 166 has an open proximal end 184 with a small lip 186 formed around the rim. In one embodiment of the storage device, the force device is at least partially disposed inside the inner tube. In the illustrated embodiment, the cylinder 158 of the gas spring 156 is disposed inside the proximal portion 188 of the inner tube 166, and the piston 160 extends out through the proximal end 184 of the tube. The inner tube 166 includes a stop 190 on which the cylinder 158 of the gas spring 156 bottoms out when the piston 160 is extended from the cylinder. Any suitable structure can be used for this purpose. In the illustrated embodiment, the stop consists of two tabs 190 that are punched into the sidewall of the inner tube 166 at 180 degrees relative to each other. The tabs 190 extend inside the inner tube 166 to provide a stop for the gas spring cylinder 158. Alternatively, the inner tube could be swaged, staked, or grooved to form the stop by reducing the inner diameter of the tube.

The inner and outer tubes 166 and 168 can be made from any material(s) suitable for constructing the resistance damper. For example, they can be made from a high strength metal or a reinforced plastic material. In one embodiment, the tubes are made from steel tubing.

As shown in FIGS. 1, 22–24 and 27–29, the storage device 10 also includes a latch block 192 which is assembled on the proximal end 184 of the inner tube 166.

The latch block 192 is shaped as a rectangular block, having a large central bore 194 therethrough from front to back. A pair of side bores 196 are formed through the sides of the latch block 192. The latch block 192 can be made from any suitable material, preferably a reinforced plastic material. The proximal end 184 of the inner tube 166 is inserted into the central bore 194 of the latch block 192. The latch block 192 is usually slip fitted onto the proximal end 184 of the inner tube 166, but alternatively it could be fixed to the end of the tube by any suitable method. The lip 186 around the proximal end 184 of the inner tube 166 insures that the latch block 192 does not slide off the end of the tube.

A pair of hinge pins 198 are fastened in the side bores 196 of the latch block 192. Preferably, the hinge pins 198 are welded in place by ultrasonic welding. The hinge pins 198 can have a knurled inner end (not shown) to insure that the pins do not become unfastened from the latch block 192 during use of the storage device 10.

The illustrated storage device also includes a latch 200 which, when in a locked position, prevents the gas spring 156 from moving the load arm 116 away from the load position. The latch 200 includes a central portion 202 that extends over the latch block 192. An ear 204 having a hole 206 therethrough extends upward from the central portion 202. A pair of hinge legs 208 extend downward from the central portion 202 on opposing sides of the latch block 192.

The hinge legs 208 have openings 210 through which the hinge pins 198 on the latch block 192 extend, thereby hingedly connecting the latch 200 to the latch block 192. A pair of hook arms 212 having hooks 214 on their ends extend rearward from the central portion 202 of the latch 200 on opposing sides of the latch block 192. As shown in FIG. 23, when the latch 200 is in a locked position, the hooks 214 latch onto the end portions 108 of the pivot axle 104 on the mount 14. The hooks 214 are locked in place by the force of the gas spring 156 pushing the inner tube 166 and the attached latch block 192 in the outward direction. The locked latch 200 prevents the gas spring 156 from raising the load arm 116 from the load position. The symmetrical design of the latch 200 maintains a balanced, centerline based holding force on the retracted gas spring 156. The latch 200 can be made from any suitable material, for example, a high strength metal such as steel.

As shown in FIGS. 1, 22, 23, 30 and 31, the storage device also includes a release mechanism 216 connected to the latch 200. The release mechanism 216 is operable to move the latch 200 from the locked position to an unlocked position. Any suitable type of release mechanism 216 can be used for this purpose. In the illustrated embodiment, the release mechanism is a release rod 216 mounted on top of the outer tube 168. The release rod 216 has an upward curved portion at its distal end that serves as a trigger 218. The trigger 218 is protected by its location between the outer tube 168 and the load arm 116, yet it is easy to reach and operate by either a left-handed or a right-handed user. The release rod 216 has a proximal end 220 including a first upward bend 222, a second upward bend 224, and a shoulder 226 between the two bends. The release rod 216 is slidably mounted on top of the outer tube 168 with the use of two rod clips 228 that are attached to the tube. The rod clips 228 each have a channel 230. The release rod 216 snaps into the channels 230 and is slidable within the channels. The shoulder 226 on the proximal end 220 of the release rod 216 extends through the hole 206 in the ear 204 of the latch 200. The bends 222 and 224 on the proximal end 220 of the release rod 216 are positioned on opposing sides of the latch ear 204 to connect the release rod 216 to the latch 200. The release rod 216 can be lightweight since the forces locking the load arm 116 in the load position are borne by the latch 200. The release rod 216 can be made from any suitable material, for example, from a metal wire such as steel wire.

Figure 32:
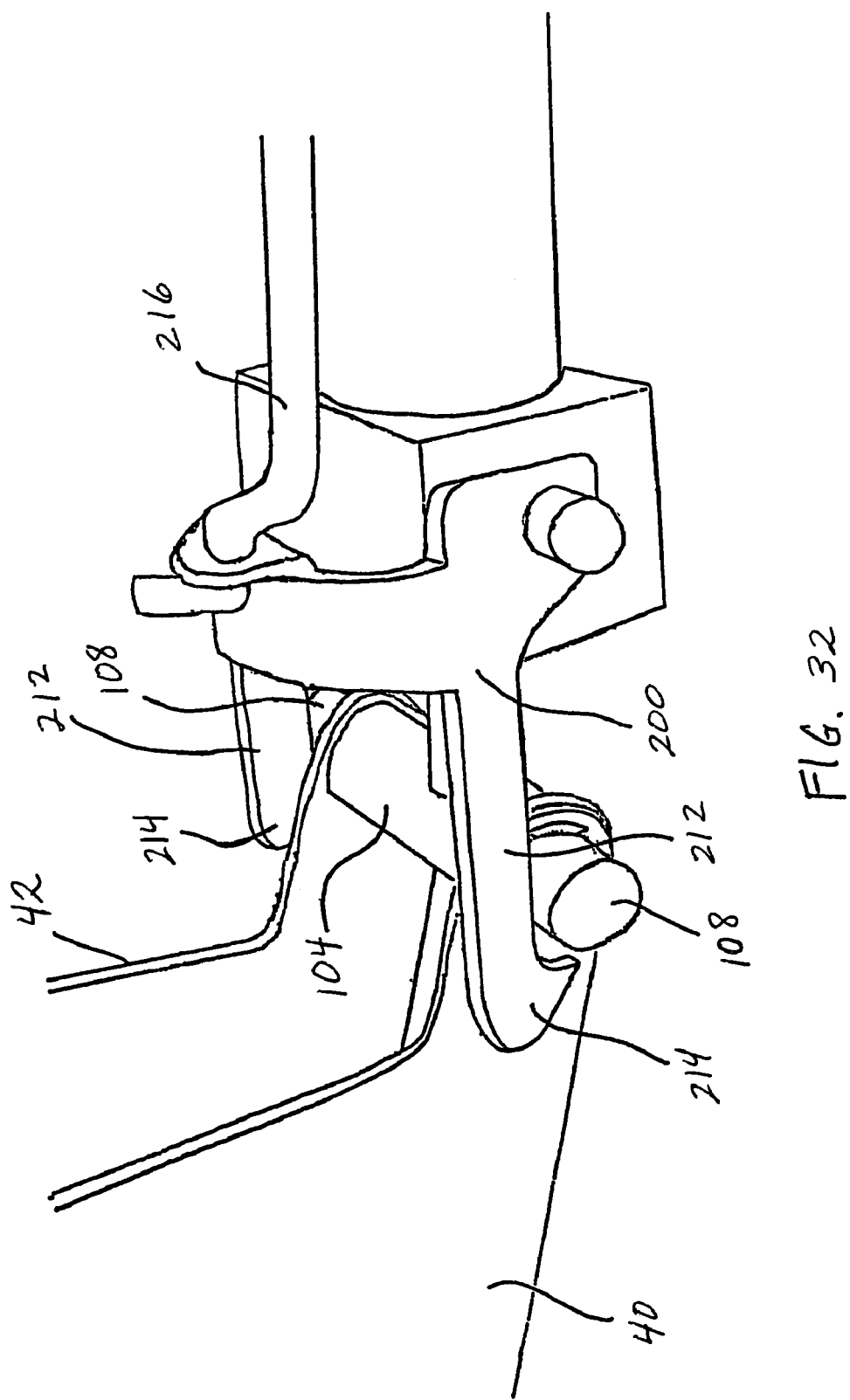
FIG. 32 is a perspective view of part of the storage device, showing the latch having been partially unlocked from the mount.
Figure 33:
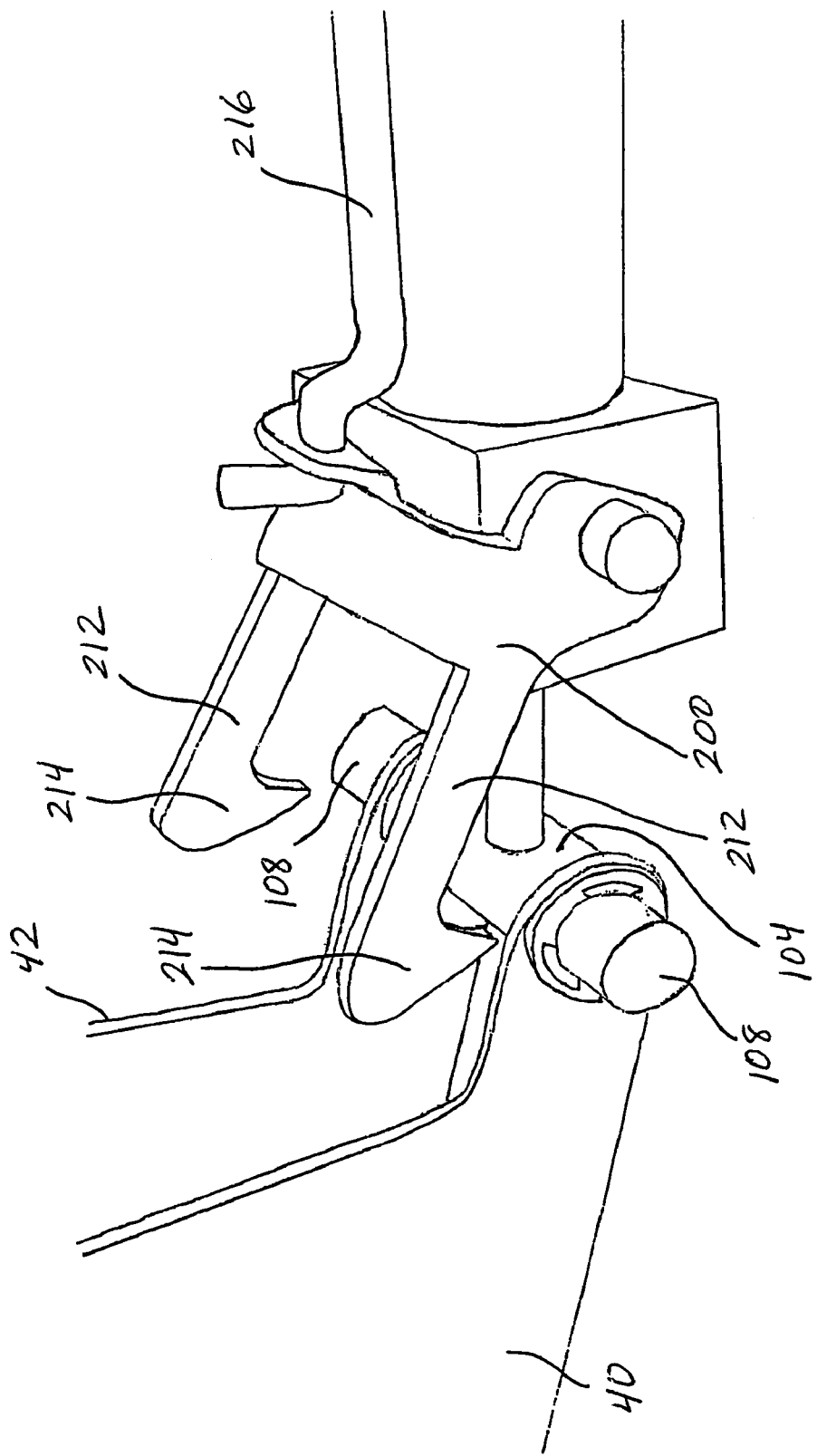
FIG. 33 is a perspective view of part of the storage device, showing the latch having been completely unlocked from the mount.

As shown in FIGS. 1, 23, 32 and 33, the storage device 10 also includes a safety locking feature that prevents unlocking of the latch 200 when the load arm 116 is in the load position. This prevents accidental release of the gas spring 156 when the load arm 116 is empty. When the load arm 116 is in the load position shown in FIGS. 1 and 23, the latch 200 cannot be unlocked because the hooks 214 of the latch 200 extend around the end portions 108 of the pivot axle 104 on the mount 14 to an extent that they prevent the hook arms 212 from moving upward away from the pivot axle 104. In order to unlock the latch 200, the user pulls the load arm 116 down a short distance from the load position to an unlock position. As shown in FIG. 32, the latch mechanism is designed with extra travel such that pulling down on the load arm causes the hooks 214 of the latch 200 to move inward a short distance away from the end portions 108 of the pivot axle 104. As shown in FIG. 33, the latch 200 can then be unlocked by the user pulling outward on the trigger of the release rod 216, which causes the attached latch 200 to pivot and the hook arms 212 of the latch 200 to move upward away from the end portions 108 of the pivot axle 104. However, the force of the gas spring 156 pushing upward on the load arm 116 makes it difficult for the user to pull down on an empty load arm. On the other hand, when an object such as a bicycle 12 is supported on the load arm 116, the weight of the object on the load arm makes it relatively easy to pull down on the load arm by pulling down on the bicycle (because the bicycle blocks the load arm), in order to unlock the latch 200. A gas spring 156 is selected to provide a force that is slightly less than the weight of the object plus a force applied by the user to pull down on the bicycle supported on the load arm 116. In a typical bicycle storage device, the gas spring pushes with about 135 to 185 pounds of force (the force is greatest when the gas spring is fully retracted), but the geometry of the system enables it to lift only a 32-pound bicycle.

Figure 24:
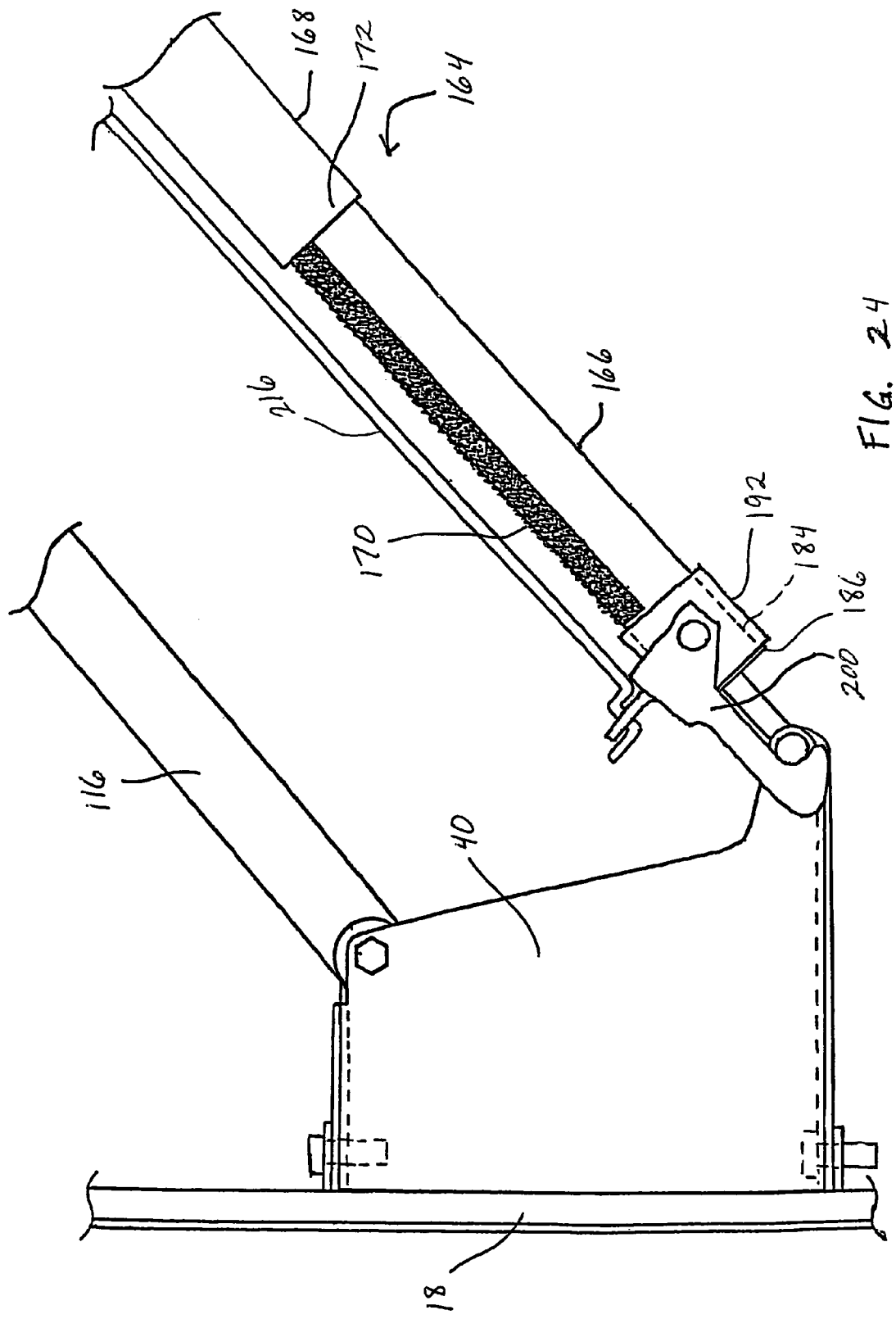
FIG. 24 is a side view of part of the storage device, showing an outer tube extended relative to an inner tube.

As shown in FIG. 24, when the latch 200 is locked, the inner tube 166 of the resistance damper 164 is prevented from moving away from the mount 14 because of its attachment to the latch block 192. However, the outer tube 168 is extendable and retractable relative to the inner tube 166 to allow the user to raise and lower the empty load arm 116. As shown in FIGS. 1 and 23, when the load arm 116 is in the load position, the proximal end 172 of the outer tube 168 abuts the latch block 192. As shown in FIG. 24, when the empty load arm 116 is raised by the user, the outer tube 168 is extended from the inner tube 166 such that the proximal end 172 of the outer tube 168 is spaced a distance away from the latch block 192. Optionally, the storage device can include a spacer (not shown) that limits the retraction of the outer tube 168 relative to the inner tube 166. Any suitable type of spacer structure can be used. In a preferred embodiment, the spacer is a partial ring that snaps onto the exterior of the inner tube 166 adjacent to the latch block 192. The partial ring can be made from any relatively flexible and strong material, such as a relatively flexible metal or plastic. When the outer tube 168 is retracted relative to the inner tube 166, the proximal end 172 of the outer tube 168 abuts the spacer instead of the latch block 192. This adjusts upward the position of the load arm when it is in the load position. The user of the storage device may desire a higher load position depending on the particular user and the particular type of bicycle or other object stored. The use of a spacer allows all storage devices to be installed at a uniform height from the floor, while allowing individual users the flexibility of adjusting the load height of the arm after installation.

In operation, the storage device 10 is initially in the load position (shown in FIG. 1) with the latch 200 locked. The user of the storage device 10 loads the bicycle 12 on the load arm 116 of the device. Then the user pulls down on the bicycle in order to pull the load arm 116 down a short distance to the unlock position, and pulls the trigger 218 on the release rod 216 that unlocks the latch 200. This releases the gas spring 156, which assists the user in pushing the load arm 116 and the supported bicycle 12 up to the store position (shown in FIG. 19) against the wall 16. When the user wishes to remove the bicycle 12 from storage, the user pulls down on the bicycle supported on the load arm 116. The upward force of the gas spring 156 ensures that the load arm 116 comes down smoothly. When the load arm 116 reaches the load position, the latch 200 becomes locked, and the user can safely remove the bicycle 12 from the load arm. The extendable inner and outer tubes 166 and 168 of the resistance damper 164 allow the user to push the empty load arm back up against the wall, out of the way. The empty load arm can be pulled down to the load position for loading the bicycle again. The resistance damper 164 ensures smooth upward and downward movements of the empty load arm.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A mounted storage device comprising:
   a mount for mounting the device on a vertical surface;
   a load arm supported on the mount and structured to support an object thereon, the load arm being movable between a load position for loading the object on the load arm and a store position for storing the supported object;
   a force device connected to the mount and to the load arm which creates a force urging the load arm in a direction from the load position to the store position; and
   a resistance damper connected to the mount and to the load arm which resists movement of the load arm in both directions between the load position and the store position, the resistance damper including a plurality of damper members, and the resistance damper creating the resistance by at least one of friction and compression tension between the damper members.

2. The storage device defined in claim 1 wherein the damper members comprise inner and outer tubes that are telescopically disposed relative to one another, and a resistance material between the tubes that creates the resistance when the tubes are extended or retracted relative to one another.

3. The storage device defined in claim 2 wherein the resistance material comprises a material attached to one of the tubes.

4. The storage device defined in claim 2 wherein the force device is at least partially disposed inside the inner tube.

5. The storage device defined in claim 4 wherein the force device comprises a gas spring including a cylinder which is disposed inside the inner tube, and a piston which is connected to the mount.

6. The storage device defined in claim 5 wherein the inner tube includes a stop on which the cylinder of the gas spring bottoms out.

7. The storage device defined in claim 1 further comprising a latch which, when in a locked position, prevents the force device from moving the load arm away from the load position.

8. The storage device defined in claim 7 wherein the latch is held in the locked position by the force of the force device.

9. The storage device defined in claim 7 wherein the storage device includes a safety locking feature that prevents unlocking of the latch when the load arm is in the load position.

10. The storage device defined in claim 9 wherein the load arm is movable from the load position to an unlock position to allow unlocking of the latch.

11. The storage device defined in claim 7 further comprising a release mechanism connected to the latch which is operable to move the latch from the locked position to an unlocked position.

12. The storage device defined in claim 11 wherein the damper members comprise inner and outer tubes that are telescopically disposed relative to one another, and wherein the release mechanism comprises a release rod which is mounted on the exterior of the outer tube.

13. The storage device defined in claim 7 wherein the damper members comprise inner and outer tubes that are telescopically disposed relative to one another, and wherein the storage device further comprises a latch block on the inner tube which supports the latch.

14. The storage device defined in claim 13 wherein the latch includes portions that connect opposing sides of the latch block to opposing sides of the mount when the latch is locked.

15. The storage device defined in claim 1 wherein the mount comprises a hinged mounting assembly that allows the load arm to be pivoted from side to side on the vertical surface.

16. The storage device defined in claim 1 wherein the mount includes a lower portion which supports the load arm and an upper portion which extends up the vertical surface from the lower portion to increase the holding power of fasteners connecting the mount to the vertical surface.

17. The storage device defined in claim 1 wherein the damper members comprise inner and outer tubes that are extendable and retractable relative to one another, the retraction of the tubes moving the load arm to the load position, and wherein the storage device further comprises a spacer that limits the retraction of the tubes to adjust the load position of the load arm.

18. The storage device defined in claim 1 wherein the load arm comprises an arm and a support structure for supporting the object connected to the distal end of the arm.

19. The storage device defined in claim 18 wherein the support structure comprises a support rod.

20. The storage device defined in claim 18 wherein the support structure comprises a support rod slidably connected to the arm and an eyebolt to lock the support rod in place relative to the arm.

21. The storage device defined in claim 18 wherein the support structure comprises a support rod connected to the arm and a pair of handlebar hooks for supporting the handlebars of a bicycle, the handlebar hooks being structured to support the handlebars and to attach to the support rod.

22. The storage device defined in claim 18 wherein the support structure comprises a support rod connected to the arm, and a seat hook including a lower hook portion for supporting the seat of a bicycle and an upper hook portion for attaching to the support rod, the upper hook portion being angled away from the lower hook portion so that the weight of the bicycle causes the upper hook portion to bind on the support rod.

23. The storage device defined in claim 18 further comprising a brace which is connectable between the mount and the support structure to lock the support structure in position.

* * * * *